United States Patent [19]

Binkley et al.

[11] Patent Number: 4,909,967
[45] Date of Patent: Mar. 20, 1990

[54] LIQUID DISTRIBUTOR ASSEMBLY FOR PACKED TOWER

[75] Inventors: Michael J. Binkley, DeSoto, Tex.; Paolo Martinenghi; Tullio Petrich, both of Pavia, Italy

[73] Assignee: Glitsch, Inc., Dallas, Tex.

[21] Appl. No.: 332,428

[22] Filed: May 15, 1989

Related U.S. Application Data

[63] Continuation of Ser. No. 266,886, Nov. 3, 1988, abandoned.

[51] Int. Cl.$^4$ .............................................. B01F 3/04
[52] U.S. Cl. ...................................... 261/97; 239/600
[58] Field of Search ...................... 261/97, 98; 239/600

[56] References Cited

U.S. PATENT DOCUMENTS

| | | | |
|---|---|---|---|
| 4,165,040 | 8/1979 | Beacham et al. | 239/600 |
| 4,264,538 | 4/1981 | Moore et al. | 261/97 |
| 4,472,325 | 9/1984 | Robbins | 261/96 |
| 4,476,069 | 10/1984 | Harper et al. | 261/97 |
| 4,479,909 | 10/1984 | Streuber | 261/97 |
| 4,557,877 | 12/1985 | Hofstetter | 261/97 |
| 4,604,247 | 8/1986 | Chen et al. | 261/94 |
| 4,689,183 | 8/1987 | Helms et al. | 261/97 |
| 4,715,537 | 12/1987 | Calder | 239/119 |
| 4,729,857 | 3/1988 | Lee et al. | 261/97 |

OTHER PUBLICATIONS

Gilbert K. Chen, *Chemical Engineering*, Mar. 5, 1984, McGraw-Hill, Inc., "Packed Column Internals", pp. 40-51.

*Primary Examiner*—Tim Miles
*Attorney, Agent, or Firm*—Johnson & Gibbs

[57] ABSTRACT

An improved liquid flow distributor assembly for a process column of the type wherein the distributor is positioned above a packing section for the distribution of liquid downwardly therethrough. The improvement comprises a plurality of troughs constructed with a series of removable distributor tube assemblies on opposite sides thereof. Each tube is constructed with a first generally U-shaped securing, or mounting channel affixed to the side of a distributor trough with a hole formed therethrough in flow communication with the lower region of the trough. An angulated distributor channel is constructed for slidable engagement with the U-shaped securing channel element. The sidewalls of the U-shaped channel are constructed for securing the sliding channel therein and forming a triangular flow conduit for receiving the discharge of fluid from the trough. The tubes depend downwardly from the side walls of the trough below the bottom region thereof so as to reduce disturbance by the raising vapor flow at the point of liquid discharge. In this manner the advantages of distributor tubes are provided in a configuration facilitating the cleaning thereof by removal of the sliding channel member from the securing channel element.

36 Claims, 3 Drawing Sheets

LIQUID DISTRIBUTOR ASSEMBLY FOR PACKED TOWER

This application is a continuation of application Ser. No. 266,886, filed 11/03/88, now abandoned.

BACKGROUND OF THE INVENTION

1. Field of the Invention

The present invention pertains to liquid distributors for vapor-liquid contact towers and, more particularly, to a distributor tube assembly for columns incorporating counter-current, vapor-liquid flow therethrough.

2. History of the Prior Art

It is well known in the prior art to utilize various types of exchange columns in which a gas and a liquid come into contact with one another, preferably in a counter-current flow for purposes of mass or heat transfer, close fractionation and/or separation of feed stock constituents, and other unit operations. Efficient operation requires mass transfer, heat transfer, fluid vaporization and/or condensation, whereby one of the fluids can be cooled with a minimum pressure drop through and in a particular zone or zones of minimum dimensions defining the area and volume thereof. These are pre-requisites of efficient operation and are necessary for close fractionation. For this reason, counter-current flow of vapor and liquid within such exchange columns have become established methods of such vapor-liquid contact in the prior art. The actual vapor-liquid interface requires the utilization of a packing bed within the column. Liquid is then distributed atop the packing bed in the most feasible manner while vapor is distributed beneath the packing bed in the lower region of the tower. In this manner liquid trickling downwardly through the packing bed is exposed to the vapor ascending therethrough for vapor-liquid contact and interaction.

It is well established that the configuration of the packing bed determines the pressure drop, efficiency of the vapor-liquid interface and the concomitant mass and energy transfer occurring in a process tower. The means for effective and even distribution of the vapor and the liquid on opposite ends of the packing bed as well as maintenance of that distribution therethrough are critical to an efficient operation. Only with efficient initial vapor and liquid distribution and the maintenance of said distribution throughout the packing bed, will homogenous mixing zones be created therethrough for maximizing the efficiency therein. Efficiency is readily convertible to cost of operation and production quality. For this reason, a myriad of prior art packing designs have been prevalent in conventional exchange columns. The efficiency of the packing is, however, limited to a large extent by the efficiency of the vapor and liquid distribution thereacross. For example, failure of either vapor or liquid to evenly distribute over cross sections of the packing effectively eliminates the utility of the part of the packing where there is poor or no distribution which in turn is directly proportional to the efficiency and cost effectiveness of the operation. The packing bed depths are critical in establishing production criteria and operational costs and failure to evenly distribute vapor-liquid and/or maintain homogeneity within the packing bed can lead to serious consequences, particularly in the petroleum refining industry.

Aside from the packing beds themselves, the liquid distributor is the most important unit of a tower internal. Failure in performance of a packed tower sometimes stems from liquid distribution problems such as clogging or uneven distribution and thus the selection of a correct liquid distributor is critical for uninterrupted plant operation. Operational considerations thus include the functional aspects of the distributor, such as how level the distributor troughs are maintained, how well the floor is equalized therethrough, and the means through which the liquid is distributed from the troughs to the packing beds there beneath. Also considered is the effect which the ascending vapor has on the liquid being distributed. When vapor flow areas are restricted flow velocity can increase to the point of interrupting the descending flow pattern. The liquid is, in essence, "blown" around, and this condition can lead to uneven distribution and inefficiency in the process column.

Conventional liquid distributors generally include the multi-orifice spray head variety adapted for dispersing liquid in the form of a spray atop a packing bed. In the utilization of dump packing wherein a plurality of random oriented packing elements are disposed, within the exchange column, such a liquid distribution technique is sometimes effective. This is true particularly when high efficiency parameters are not of critical significance. However, in the event of high efficiency packing such as that set forth in U.S. Pat. No. 4,604,247 assigned to the assignee of the present invention, means for homogeneous liquid and gas distribution are of extreme importance.

The cost of high efficiency packing of the type set forth in the aforesaid patent commands attention to proper vapor-liquid distribution. Even small regions of non-homogenous interaction between the vapor and liquid is an expensive and wasteful loss not consistent with the utilization of high efficiency packing, where space and homogeneity in vapor-liquid interface is both expected and necessary for proper operation. High efficiency packing of the state of the art varieties set forth and shown in the aforesaid U.S. Patent requires counter-current vapor-liquid flow through the channels defined by opposed corrugations of sheets disposed therein. If the initial liquid or gas distribution fails to enter a particular corrugation pattern, then precious surface area is lost in the packing until the liquid and vapor are urged to migrate into and interact through the unfilled regions of the packing. Only by utilizing proper vapor and liquid distribution means may effective and efficient utilization of high efficiency packing as well as conventional dumped packing be assured.

The development of systems for adequate liquid distribution in process towers has been limited as set forth above. In the main, it is known to discharge and distribute liquids with spray orifices, pipes, perforated plates, apertured troughs and nozzles. Gas is concomitantly discharged in an ascending turbulent configuration to provide adequate vapor distribution. Although many prior art systems are generally effective in distributing some vapor and some liquid to most portions of the packing bed, uniform distribution thereacross is usually not obtained without more sophisticated distribution apparatus. For example, unless gas is injected into a myriad of contiguous areas beneath the packing bed with equal pressure in each area, the mass flow of vapor upwardly through the packing bed cannot be uniform. Random vapor discharge simply distributes unequal amounts of vapor across the lower regions of the packing bed but does not in any way assure equality in the distribution. Likewise the simple spray of liquid atop the packing bed, though intended to be effective in wetting all surface areas, often results in high concentrations of liquid flow in certain packing bed areas and less flow in others. This, of course, depends on the spray device. Orifice distributors are generally more susceptible to plugging than other types of distributors, and plugging is generally non-uniform to uneven irrigation within the tower. Surface irregularities in a distributor pan occurring during manufacture likewise increase flow resistance of some perforations or induce liquid flow along the bottom of the pan which is a distinct disadvantage. Any flow irregularity which focuses the flow in one area while reducing flow in other areas is deleterious.

It has been discovered that with pipe distributors consisting of headers equipped with tributary pipes or laterals that have holes or nozzles to spray liquid, the liquid is often distributed to finely. Tiny drops of the liquid then get carried out of the tower by counter-current gas flow. This prevents the liquid from even coming in contact with the packing bed. Since liquid contact is the purpose of the packing therebeneath, such a result totally frustrates the intent of the liquid distributor. As much as 5% of the liquid flowing through a nozzle can be converted to mist at a pressure drop of 20 psi. It has also been noted that nozzle equipped pipe distributors can produce overlapping spray patterns which result in increased flow in certain areas with reduced flow in other areas. Moreover, spray headers also release liquid at speeds that can cause it to pass vertically through the packing before it has a chance to spread out horizontally depending on the particular packing type.

These issues are important as well as the critical issue of the number of liquid distribution points necessary for various tower diameters, packing heights, materials and systems. It is critical that the packing height not be too great wherein the weight of the packing will cause it to crush itself. However, liquid redistributors between packing sections are expensive and take up heights that could otherwise be used for mass transfer. One consideration is the type of packing being used. Structured packing can tolerate very little maldistribution while dump packing on the other hand can sustain larger variations in liquid distribution.

Unfortunately, the manifestation of uneven liquid distribution generally occurs in the vicinity of the most even, or uniform, vapor distribution. The opposite is also true. This is because vapor has had a chance to more evenly distribute through the packing bed prior to engaging the liquid distribution flow. It would be an advantage, therefore, to provide means for even liquid and vapor distribution prior to entry of said vapor and liquid into the packing bed and in a manner providing both a uniform spread of said liquid and vapor and uniform volumetric distribution thereof.

The present invention provides such an improved system of vapor-liquid distribution through a tube-trough distributor wherein each trough is constructed with a plurality of tubes that depend below the bottom region thereof so as to prevent disturbing the rise of vapor flow at the point of liquid discharge. Each tube is constructed with a first, generally U-shaped mounting channel secured to the side of the distributor trough with at least one hole formed therethrough in flow communication with the lower region of the trough. An angular distributor pipe channel is constructed for slidable engagement with the U-shaped channel. In this manner the advantages of distributor tubes are provided in the configuration facilitating the cleaning of the trough and the flow apertures by the removal of the trough and the flow apertures by the removal of the sliding channel member from the securing channel element. Liquid flow efficiency is thus provided in a more cost efficient, reliable configuration.

SUMMARY OF THE INVENTION

The present invention pertains to liquid distribution systems adapted for uniformly distributing liquid flow through a process tower. More particularly, one aspect of the invention comprises an improved liquid distributor for process columns of the type wherein vapor is injected into the column for ascension therethrough and liquid is dispersed in the column for downward flow. Packing sections, or beds, are disposed in the tower for facilitating the interaction of vapor and liquid passing in counter-current flow therethrough. The improvement comprises a liquid flow distributor adapted for positioning above the packing section for the even distribution of liquid downwardly therethrough. The distributor comprises a trough having a plurality of removal distributor tube assemblies on opposite sides thereof. Each tube is constructed with a first generally U-shaped mounting channel secured to the side of the distributor trough with at least one hole formed therethrough and flow communication with the lower region of the trough. An angulated distributor pipe channel is constructed for slidable engagement with the U-shaped channel. The end of the side walls of the U-shaped channel may be tapered for securing the sliding channel therein and forming a triangular flow conduit for receiving the discharge of flow from the trough. The tubes each depend downwardly from the side walls of the trough below the bottom region thereof so as to prevent disturbing the rising vapor flow at the point of liquid discharge.

In another aspect, the invention includes the liquid distributor described above wherein the troughs are formed with opposite side wall body sections and each of the body sections have holes formed therein for spewing liquid outwardly therefrom. The distributor tubes are disposed outwardly of the body section of the troughs and each of the tubes are in flow communication with at least one of the holes formed therein for receiving the spew of liquid therefrom. At least some of the tubes are constructed with a first generally U-shaped channel affixed to the side wall of the trough and a second generally V-shaped channel is removably received therein for permitting access to the holes. The tubes depend below the bottom region of the trough for discharging liquid downwardly therefrom.

In yet another aspect, the above described invention includes the generally U-shaped channels being bolted and/or welded to the side walls of the troughs. The U-shaped channels are constructed with opposite side wall flanges that taper one toward the other. In one embodiment, opposite side wall flanges of the U-shaped trough are angled one toward the other at approximately the same angle relationship. The generally V-shaped channel may then be received within the generally U-shaped channel and be constructed with first and second side walls formed at an angle equal to 180 degrees less the sum of the inwardly formed angle of each side wall flange of the U-shaped channel. It is preferable for the V-shaped channel to be slidably mounted within the U-shaped channel and secured within the U-shaped channel by a pin disposed therein or by an inwardly flared region of the U-shaped channel which is constructed for engaging the V-shaped channel and preventing its passage therethrough.

In yet a further aspect, the invention includes an improved method of imparting liquid flow distribution in a process column having a plurality of troughs with opposite sidewall body sections having holes formed therein for spewing liquid outwardly therefrom. The improvement comprises forming a plurality of U-shaped channels with at least one aperture therein and affixing them to the body sections of the troughs with the aperture in registry with one of the holes. A plurality of V-shaped channels are formed and adapted for being removably received within the U-shaped channels and secured therein in a position outwardly of the apertures for receiving the spew of liquid therefrom. The troughs are then mounted in a process column for receiving the flow of liquid and distributing it downwardly through the tubes.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
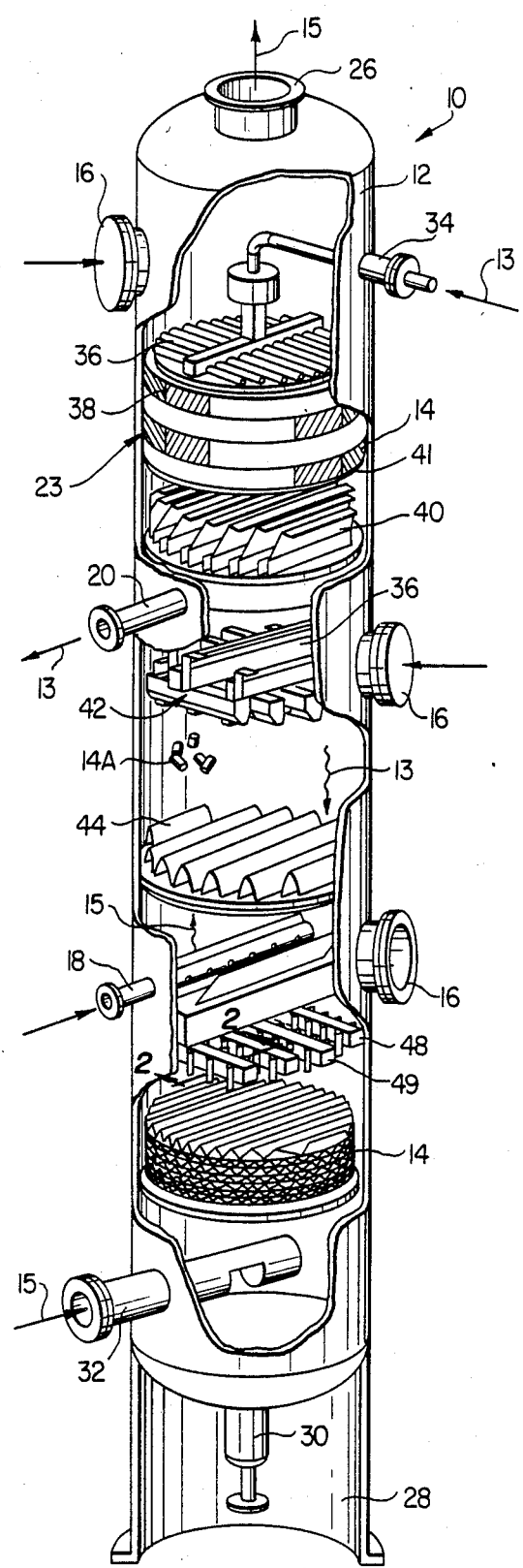
FIG. 1 is a perspective view of a packed column with various sections cut away for illustrating a variety of tower internals and one embodiment of a liquid flow distributor trough constructed in accordance with the principles of the present invention disposed therein.

Referring first to FIG. 1, there is shown a perspective view of a packed exchange tower or column with various sections cut away for illustrating a variety of internals and the utilization of one embodiment of the liquid distributor of the present invention. The exchange column 10 of FIG. 1 comprises a cylindrical tower 12 having a plurality of packing bed layers 14 disposed therein. A plurality of manways 16 are likewise constructed for facilitating access to the internal region of the tower 12 for replacement of the packing beds 14. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the packing beds, and is enriched or added to by material which condenses into it out of the vapor stream.

Still referring to FIG. 1 the exchange column 10 further includes a vapor outlet, overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the packing layers 14. Reflux from condensers is provided in the upper toward region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for purpose of illustration and include a liquid collector 40 disposed beneath a support grid 41 in support of the upper structured packing 38. A liquid redistributor 42 is likewise disposed there beneath and an intermediate support plate 4 is provided in an alternative configuration of the type adapted for supporting random packing 14A of a ring or saddle variety as representatively shown. A lower grid 46 is illustrated disposed beneath a liquid distributor 48 comprising a plurality of troughs 49 adapted for dispersing the liquid 13 thereacross in counter-current flow to the ascending vapor there beneath. It may be seen from this figure that the countercurrent configuration between the ascending vapor 15 and the descending liquid is the subject of a plurality of critical design considerations including liquid/vapor ratios, liquid cooling, foaming and the presence of solids or slurries therein. Corrosion is likewise a consideration of the various elements in the packed towers and the selection of the material in the fabrication of the tower internals is in many instances the results thereof. The anatomy of the packed column as shown in FIG. 1 is likewise described in more detail in an article by Gilbert Chen entitled "Packed Column Internals" appearing in the March 5, 1984 edition of Chemical Engineering incorporated herein by reference.

Figure 2:
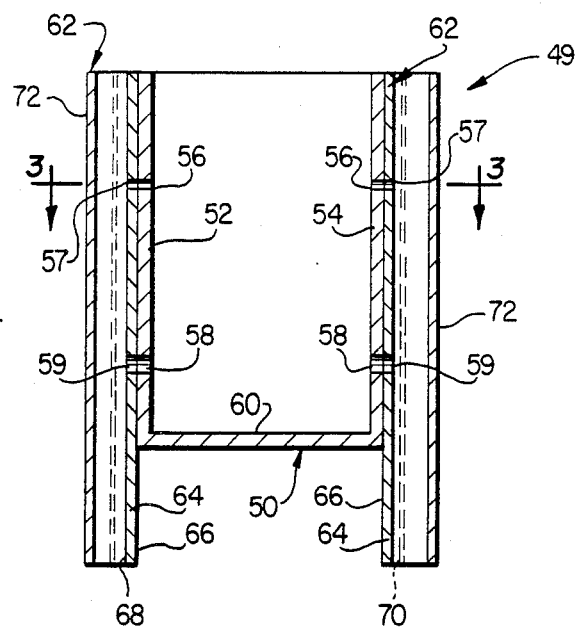
FIG. 2 is an enlarged side elevational, cross-sectional view of the liquid flow distributor trough of FIG. 1 taken along lines 2—2 thereof having a plurality of removable distributor tube assemblies on opposite sides thereof and constructed in accordance with the principles of the present invention.

Referring now to FIG. 2 there is shown an enlarged end elevational cross-sectional view of a trough 49 having a lower body section 50. The trough section 50 is comprised of outer walls 52 and 54 upstanding from a bottom surface 60. A series of upper apertures 56 and lower apertures 58 are formed in the side walls 52 and 54 for purposes of allowing liquid flow outwardly of the trough 49. Outwardly of the apertures 56 and 58 is a removable distributor tube assembly adapted for receiving the flow of liquid therefrom and channeling said liquid downwardly into a packing bed there beneath (not shown). Each tube assembly 62 comprises a modified U-shaped channel 64 that is secured to the side wall of the trough 49 by arc welding or the like. The channel 64 is constructed with a substantially planar base wall 66 and two upstanding side wall lips 68 and 70. Only one of the side walls 68 and 70 are shown on opposite sides of trough 49 in FIG. 2 because of the cross-sectional angle, and then only in phantom. They are shown more clearly and in detail below. What is shown is an aperture 57 formed in base wall 66 in line with aperture 56 and an aperture 59 formed in base wall 66 in line with aperture 58. A generally V-shaped channel 72 of mating size is received within the U-shaped channel 64 in slidable engagement therewith providing the necessary assemblage for serving as a flow distributor drip tube that is both efficient and removable. The removable aspect will be discussed in more detail below but it may be appreciated that its removability feature facilitates cleaning of the aperture 56 and 58 which can easily become clogged during normal process tower operations.

Figure 3:
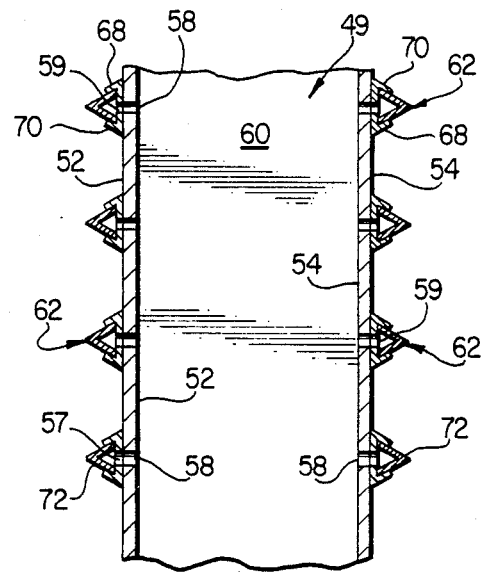
FIG. 3 is an enlarged top plan, cross-sectional view of the trough of FIG. 2 taken along lines 3—3 thereof and illustrating the placement of the removable distributor tube assemblies therealong.

Referring now to FIG. 3 there is shown a top plan view of the distributor trough 49 wherein a plurality of drip tube assemblies 62 are shown. The bottom 60 is shown between the apertures 58 of walls 52 and 54. The tube assemblies 62 are each secured to the outer walls 52 and 54, and provide the necessary flow channeling therethrough. The V-shaped of channel 72 and modified U-shape of channel 64 is more clearly shown. The slidable, interlocking engagement can be better appreciated in this view.

Figure 4:
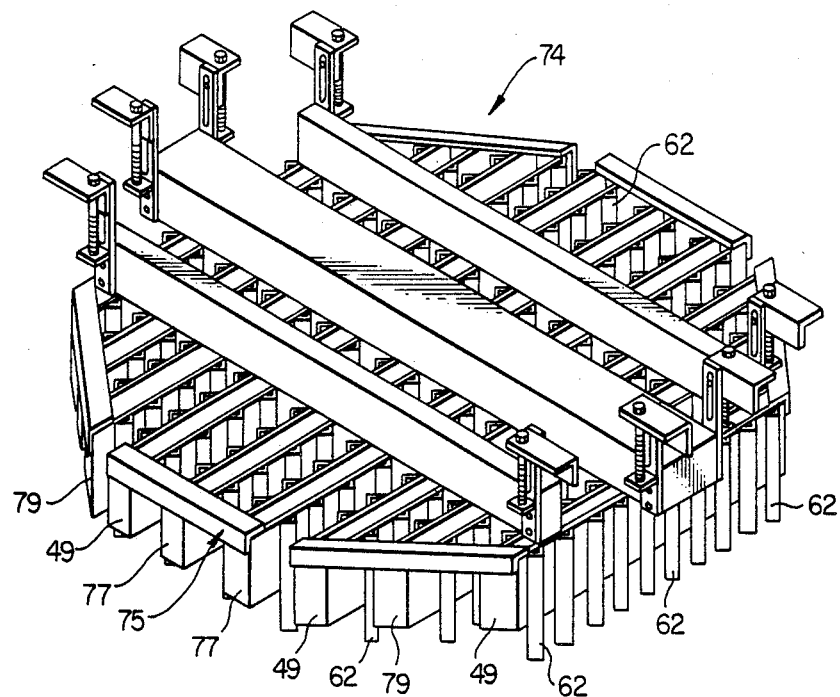
FIG. 4 is an enlarged, perspective view of the flow distributor array of the present invention illustrating a multitude of distributor tube assemblies assembled thereto in accordance with the principles of the present invention.

Referring now to FIG. 4 there is shown a plurality of troughs 49 constructed in accordance with the principles of the present invention and second one to the other into an array 74 by a frame network 75. It may be seen that the tubes 62 depend downwardly from the troughs 49 in this perspective view. Trough ends 77 are of a shorter length and angle in certain sections of the assembly; for purposes of being received within a round process tower. In many instances the trough ends 77 include an angulated end face 70 for purposes of fitting within a cylindrical process tower such as that shown in FIG. 1. The drip tubes 62 depending from the troughs 49 are thus positioned for providing uniform liquid flow therefrom as well as providing means for maintaining the integrity of the flow system during standard maintenance operation. This particular type of array construction is further described in U.S. Pat. No. 4,729,857 assigned to the assignee, of the present invention and incorporated herein by reference.

Figure 5:
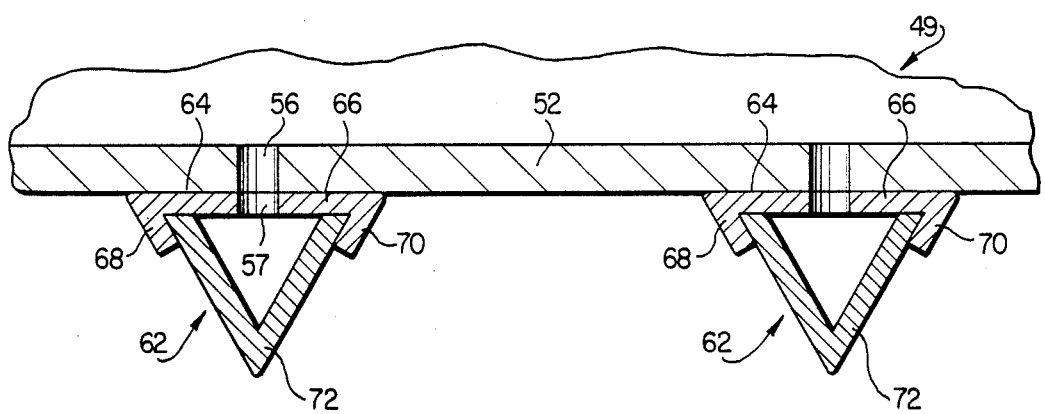
FIG. 5 is an enlarged top plan, fragmentary view of the flow distribution trough of FIG. 2 illustrating the construction of the removable distributor tube assembly thereof.

Referring now to FIG. 5 there is shown an enlarged top plan, cross-sectional view of a distributor tube assembly 62 constructed in accordance with the principles of the present invention. Each tube assembly comprises the back section 66 described above which is secured to the side wall 52 or 54 of the trough 49 by bolting, riveting, arc welding or the like. Side wall 52 is illustrated in this view. The apertures 56 are aligned therein for permitting liquid flow from the trough 49 into the tube assembly through aperture 57. Opposite sides 68 and 70 of the U-shaped channel 64 are angulated inwardly at a slight angle (on the order of 60 degrees) in order to facilitate securement of the generally V-shaped channel or pipe member 72 therein. It may be seen that the pipe member 72 therein is of substantially equivalent size and has a side wall angle substantially equal to the angle created by the side wall 68 and 70 relative to the base wall 66 of the generally U-shaped channel 64. In this manner a giant triangular configuration is therein provided for flow distribution in a drip tube format. In the present embodiment an equilateral triangle is created wherein each angle has an arc or approximately 60 degrees. This angle is only preferable, not critical. It may further be seen that the width of the channel 72 at its base is slightly less than the width of the inside dimension of the U-shaped channel 64 between the inside walls 68 and 70 for purposes of facilitating the slip fit inter-engagement.

Figure 6:
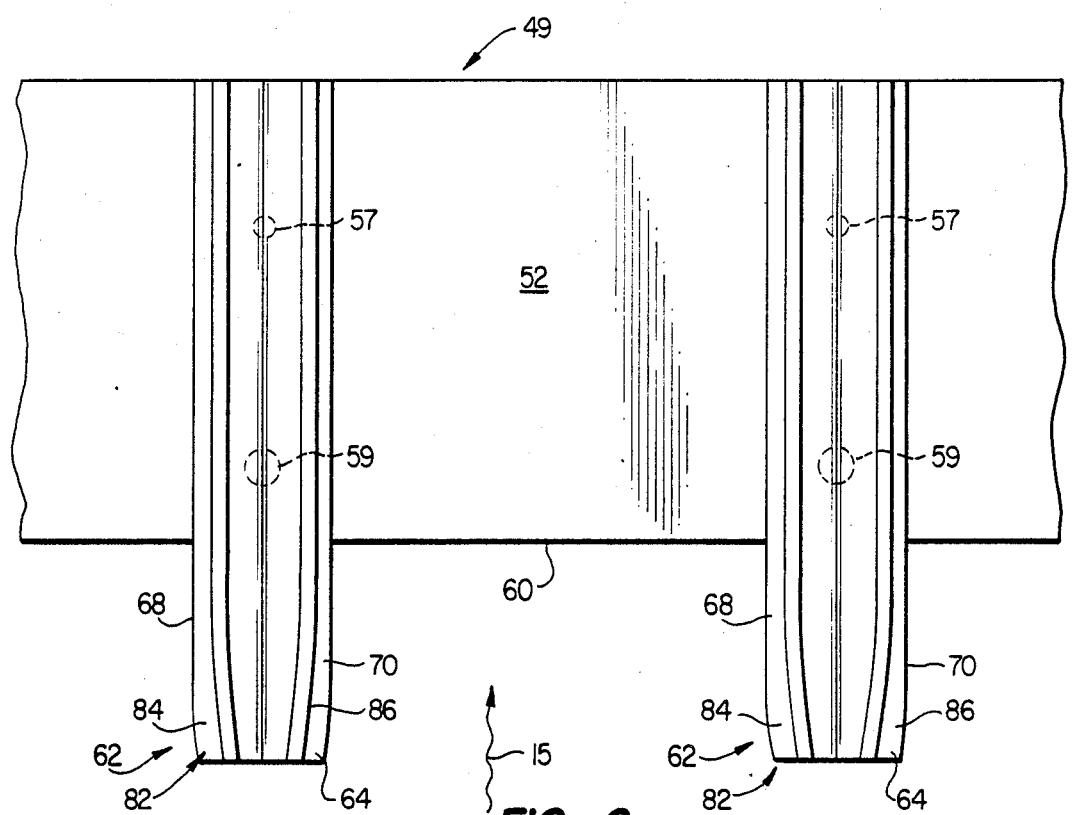
FIG. 6 is an enlarged side elevational view of the trough of FIG. 2 illustrating the flow of liquid therethrough.

Referring now to FIG. 6 there is shown a side elevational view of the trough 49 having a drip tube assemblies 62 assembled thereto with the flow of liquid therefrom. In this view it may be seen that lower regions 82 of each channel 64 are slightly tapered by tapered sections 84 and 86. These tapered sections 84 and 86 are angled inwardly for squeezing or sandwiching the V-shaped tube 72 within the channel 64. This prevents the tube from sliding downwardly and out of the select flow configuration. It also provides an inexpensive yet reliable means for securing the inter-engagement between the V-shaped tube and the U-shaped channel, 72 and 64, respectively. Other securing methods may be used and an alternative construction is described below. The flow of liquid from the tubes is illustrated by a plurality of droplets 90 which may be seen to form a multitude of streams, in some instances at least three separate streams. This three-sided flow pattern is achieved by virtue of the three sides of the triangular configuration as shown above. The fluid flow has a propensity for accumulating in the corners during descending flow thereby increasing the droplet size and maximizing it resistance to disruption by ascending vapor flow. In this manner the tube assembly is efficient in overcoming many of the disadvantages of standard distributor arrangements. It may also be seen that by positioning the U-shaped channels 64 below the bottom 60 of the trough 49, the removable V-shaped tube 72 completes its formation of a tubular conduit at a point disposed sufficiently beneath the trough 49 so as to be outside the area of maximum turbulence. This turbulence is created when the ascending vapor 15 engages the substantially planar section of the bottom of the trough 60. Although other drip tube configurations and distributors dispose the tubes downwardly of the distributor trough, in the present embodiment, the tube assembly 62 comprises at least two parts and in a configuration allowing sufficient access to the apertures 57 and 59 providing the liquid flow communication to permit cleaning and proper maintenance thereof. The construction of the channel 64 and V-shaped tube section 72 from stainless steel or the like has been shown to be acceptable in producing the efficiency, reliability and flow pattern described herein. It should be noted in particular that the material of the channels 64 and 72 do not have to match each other or the trough. This allows flexibility in material choice for particular applications.

Figure 7:
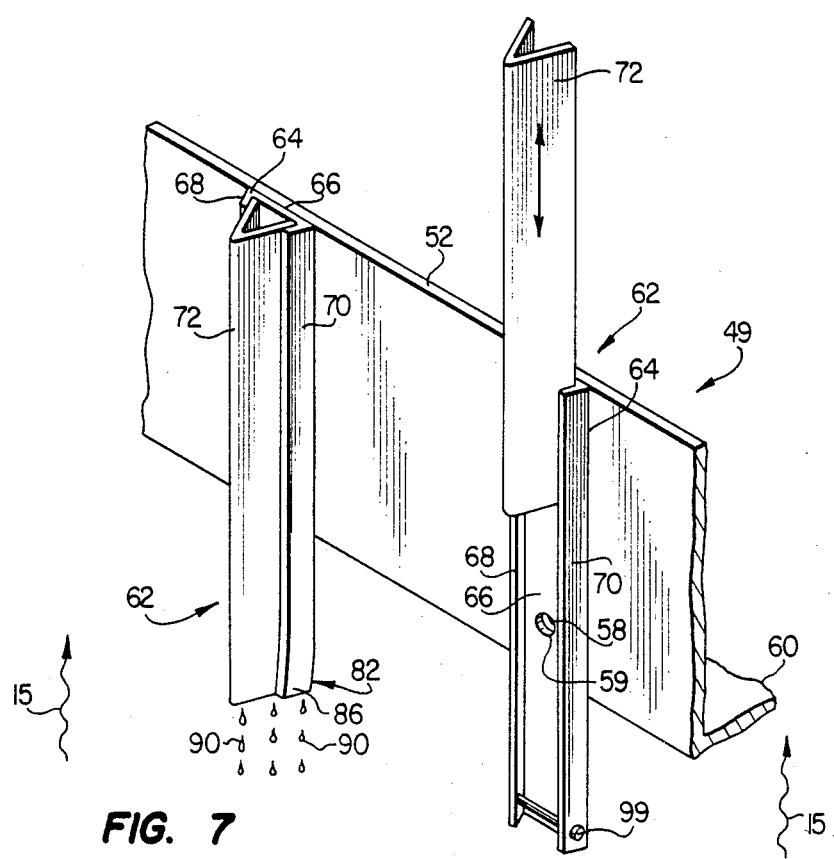
FIG. 7 is a perspective view of the tube assembly of FIG. 6 illustrating the removal of a section of the tube therefrom in accordance with the principles of the present invention.

Referring now to FIG. 7 there is shown a perspective view of a tube assembly 62 of FIG. 6 with one of the outer channels 72 being removed upwardly therefrom. The channel is shown in a upwardly positioned configuration maintaining a sliding relationship with the U-shaped channel 64. In this view the apertures 58 and 59 are exposed in the side wall 52 of the trough 49. It is in this position that cleaning of said apertures is possible in accordance with the principles of the present invention. Also shown in this FIG. 7 is an alternative embodiment of retaining means for the V-shaped channel 72. Instead of tapered, or inwardly flared, regions 84 and 86, the U-shaped channel 64 has untapered side walls with a pin assembly 99 extending therethrough for retaining the V-shaped channel 72 therein.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

We claim:

1. An improved liquid flow distributor for a process column of the type wherein said distributor is positioned above a packing section for the distribution of liquid downwardly therethrough, said improvement comprising:

a plurality of troughs;
   said troughs being formed with opposite side wall body sections, each of said body sections having holes formed therein for spewing liquid outwardly therefrom;
   a plurality of distributor tubes disposed outwardly of said body section of said troughs, each of said tubes being in flow communication with at least one of said holes formed therein for receiving the spew of liquid therefrom;
   at least some of said tubes being constructed with a first channel affixed to said side wall of said trough and a second channel removably received therein for permitting access to said holes; and
   said tubes depending below the bottom region of said trough for discharging liquid downwardly therefrom.

2. The apparatus as set forth in claim 1 wherein said first channel is bolted to said side wall of said trough.

3. The apparatus as set forth in claim 1 wherein said first channel is arc welded to said side wall of said trough.

4. The apparatus as set forth in claim 1 wherein said first channel is constructed with opposite side wall flanges, said flanges tapering one toward the other.

5. The apparatus set forth in claim 4 wherein said opposite side wall flanges of said troughs are angled one toward the other at approximately the same angle relationship.

6. The apparatus set forth in claim 5 wherein the second channel may be received within said first channel and constructed with first and second side walls formed at an angle equal to 180 degrees less the sum of the inwardly formed angle of each side wall flange of said first channel.

7. The apparatus as set forth in claim 1 wherein said tubes are disposed in generally parallel spaced relationship, one to the other.

8. The apparatus as set forth in claim 1 wherein said distributor tube is constructed with an aperture formed in said first channel, said aperture being in registry with at least one of said holes formed in said body section when said first channel is affixed thereto.

9. The apparatus as set forth in claim 1 wherein said first channel is generally U-shaped.

10. The apparatus as set forth in claim 1 wherein said second channel is generally V-shaped.

11. The apparatus as set forth in claim 1 wherein troughs of said distributor are disposed in generally parallel spaced relationships.

12. The apparatus as set forth in claim 11 wherein said troughs are of a box construction with generally parallel side walls terminating in a substantially flat bottom section.

13. The apparatus as set forth in claim 12 wherein ends of select ones of said troughs are constructed with angulated sections for facilitating securement within cylindrical process towers.

14. The apparatus as set forth in claim 13 wherein certain ones of said select ones of said troughs having angulated end sections are constructed of a shorter length for facilitating positioning with narrow regions of cylindrical process towers.

15. The apparatus as set forth in claim 1 wherein at least some of said tubes are disposed in flow communication with at least two of said holes formed in said body sections.

16. The apparatus as set forth in claim 15 wherein said two holes in flow communication with each said tube are formed one above the other and wherein one of said holes is larger than the other.

17. The apparatus as set forth in claim 1 wherein said first channel is generally U-shaped and said second channel is generally, V-shaped.

18. The apparatus as set forth in claim 17 wherein said tubes are each constructed with said U-shaped channel affixed to said side walls of said troughs and said V-shaped channel received therein.

19. The apparatus as set forth in claim 17 wherein said V-shaped channel is slidably mounted within said U-shaped channel.

20. The apparatus as set forth in claim 19 wherein said V-shaped channel is slidable secured within said U-shaped channel by a pin disposed in said U-shaped channel.

21. The apparatus as set forth in claim 19 wherein said V-shaped channel is slidably secured within said U-shaped channel by retaining means disposed in said U-shaped channel.

22. The apparatus as set forth in claim 21 wherein said retaining means comprises a lower, inwardly flared region of said U-shaped channel which is constructed for engaging said V-shaped channel and preventing its passage therethrough.

23. An improved method of imparting liquid flow distribution in a process column of the type wherein a distributor is positioned above a packing section for the distribution of liquid downwardly therethrough, said improvement comprising the steps of:

forming a plurality of troughs with opposite sidewall body sections having holes formed therein for spewing liquid outwardly therefrom;
   forming a plurality of first channels with at least one aperture therein;
   affixing said first channels to said body section of said trough with said aperture in registry with one of said holes and wherein said first channels depend below the bottom region of said trough;
   forming a plurality of second channels adapted for being removably received within said first channels;
   securing said second channels in said first channel in a position outwardly of said aperture for receiving the spew of liquid therefrom; and
   mounting said troughs in said process column for receiving the flow liquid and distributing it downwardly through said tubes.

24. The method as set forth in claim 23 wherein said step of affixing said first channels includes the step of bolting said first channel to said trough.

25. The method as set forth in claim 23 and further including the step of forming said second channel for slidable engagement within said first channel for permitting access to said aperture therein.

26. The method as set forth in claim 23 wherein said first channels are formed in a U-shaped and said second channels are formed in a V-shape.

27. The method as set forth in claim 23 wherein said second channels are formed in a V-shape.

28. The method as set forth in claim 23 wherein said first channels are formed in a U-shape.

29. The method as set forth in claim 23 wherein said step of forming said first channels includes the step of forming opposite side wall flanges, said flanges tapering one toward the other.

30. The method as set forth in claim 29 and further including the step of forming said opposite side wall flanges of said first troughs one toward the other at approximately the same angle relationship.

31. The method as set forth in claim 30 and further including the step of forming said second channel to be received within said first channel, and said second channel having first and second side walls formed at an angle equal to 180 degrees less the sum of the inwardly formed angle of each side wall flange of said first channel.

32. A liquid flow distributor for a process column comprising:
 a plurality of troughs formed with opposite side wall body sections, said troughs having at least one aperture formed therein for spewing liquid outwardly therefrom;
 at least one of said troughs having a first channel affixed to its side wall, said first channel having at least one opening for receiving said spewing liquid and a second channel removably received by said first channel, said first and second channels defining a distributor tube for discharging liquid downwardly therefrom.

33. The apparatus as set forth in claim 32 wherein said first and second channels extend below a bottom surface of said trough.

34. The apparatus as set forth in claim 32 wherein said first and second channels define a generally triangular shaped distributor tube.

35. The apparatus as set forth in claim 32 wherein said first channel is constructed with a pair of side wall flanges, said flanges tapered one toward the other.

36. The apparatus as set forth in claim 35 wherein said second channel includes a pair of side wall flanges, said second channel side wall flanges receivably engaging said first channel side wall flanges.

* * * * *